(12) United States Patent
Tendyra et al.

(10) Patent No.: US 10,940,933 B2
(45) Date of Patent: Mar. 9, 2021

(54) DOOR OPENING SYSTEM WITH A DECELERATION MECHANISM

(71) Applicant: AIRBUS HELICOPTERS DEUTSCHLAND GMBH, Donauworth (DE)

(72) Inventors: Thomas Tendyra, Schwenningen (DE); Stephen Ward, Donaumuenster (DE); Guido Borchers, Augsburg (DE); Uwe Renner, Friedberg (DE); Xaver Pascoe, Munich (DE); Markus Buehlmeyer, Buttenwiesen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 16/597,179

(22) Filed: Oct. 9, 2019

(65) Prior Publication Data

US 2020/0115028 A1    Apr. 16, 2020

(30) Foreign Application Priority Data

Oct. 10, 2018    (EP) .................................... 18400029

(51) Int. Cl.
*B64C 1/14* (2006.01)
*E05B 17/00* (2006.01)
(Continued)

(52) U.S. Cl.
CPC ........ *B64C 1/1469* (2013.01); *E05B 17/0041* (2013.01); *E05B 51/023* (2013.01); *B64C 2001/009* (2013.01)

(58) Field of Classification Search
CPC ... B64C 1/1469; B64C 1/14; B64C 2001/009; E05B 17/0041; E05B 51/023; E05B 63/0052; E05F 11/54; E05Y 2900/502
(Continued)

(56) References Cited

U.S. PATENT DOCUMENTS 4,230,352 A    10/1980    Sealey et al.
2004/0094670 A1    5/2004    Pratt et al.
(Continued)

FOREIGN PATENT DOCUMENTS

DE    102007041387 A1    3/2009
EP    1832508 A1    9/2007
RU    2467920 C1    11/2012

OTHER PUBLICATIONS

European Search Report for European Application No. EP 18400029. 7, Completed by the European Patent Office, dated Mar. 13, 2019, 5 pages.

*Primary Examiner* — Claude J Brown
(74) *Attorney, Agent, or Firm* — Brooks Kushman P.C.

(57) ABSTRACT

A door opening system with a deceleration mechanism may be adapted to control an opening of a door module that includes a door panel and a door frame. Deceleration mechanism may include strap that connects door panel with door frame, spool, and spool. Spool may receive one end of strap, is biased to roll up a first portion of strap, and adapted to perform a first unwinding of the first portion of strap. Spool may receive a second end of strap, is biased to roll up a second portion of strap, and adapted to perform a second unwinding of the second portion of strap from spool. Spool may include a braking apparatus that is adapted to decelerate the second unwinding when a velocity of the second unwinding is above a predetermined threshold.

20 Claims, 5 Drawing Sheets

(51) Int. Cl.
*E05B 51/02* (2006.01)
*B64C 1/00* (2006.01)

(58) Field of Classification Search
USPC .................................................... 244/129.5
See application file for complete search history.

(56) References Cited

U.S. PATENT DOCUMENTS

| | | | |
|---|---|---|---|
| 2007/0235588 A1* | 10/2007 | French | B64C 1/1469 244/129.1 |
| 2008/0054123 A1 | 3/2008 | French et al. | |
| 2009/0057490 A1 | 3/2009 | Klarmann et al. | |
| 2016/0144944 A1* | 5/2016 | Goings | E05F 11/54 244/129.5 |

* cited by examiner

DOOR OPENING SYSTEM WITH A DECELERATION MECHANISM

CROSS-REFERENCE TO RELATED APPLICATIONS

This application claims priority to European patent application No. EP 18400029.7 filed on Oct. 10, 2018, the disclosure of which is incorporated in its entirety by reference herein.

BACKGROUND OF THE INVENTION

(1) Field of the Invention

The invention is related to a deceleration mechanism for a door opening system, and, more particularly, to a mechanism for decelerating a door opening movement in case of a compartment decompression.

(2) Description of Related Art

Most aircrafts have a door that separates the cockpit from the remaining portions of the aircraft. For example, due to safety concerns, commercial aircrafts usually have a door that separates the cockpit (i.e., the pilot area) from the cabin (i.e., the passenger area). The door that separates the cockpit from the cabin is sometimes also referred to as the cockpit door.

When cruising at high altitudes, the cockpit and cabin of aircrafts are usually pressurized at a pressure that is higher than the ambient pressure. In some situations, the pressure in the cockpit may drop rapidly and become much lower than the pressure in the cabin. For example, a bird may strike and break a cockpit window causing such a rapid pressure drop in the cockpit. In this case, a fast decompression of the cabin is necessary to avoid an aggravating of the situation in which the structural loads of the aircraft could reach its load limits ultimately resulting in the crash of the aircraft.

Generally, the cockpit door aboard the aircraft provides the primary means of dissipating pressure from the cabin to the cockpit during a cockpit decompression case. A cockpit decompression case may occur as a minimal opening involving relatively slow bleed pressure or as a maximum opening involving a rapid loss of pressure. To ensure that the difference in pressure between the cabin and the cockpit does not exceed structural limitations of the aircraft, the cockpit door must be released and opened within a short time period. The time for opening the cockpit door includes the time for releasing the door lock and the time for rotating the door into the open position.

To satisfy certification requirements defined by aviation authorities, it has to be demonstrated that an aircraft can sustain a decompression case without a subsequent loss of essential structure/equipment and life. For example, JAR 25.365(e)(2) specifies that the aircraft structure must be able to withstand the depressurization caused by an instant opening of a predetermined area in the pressurized shell at any operating altitude.

Document EP 1 832 508 A1 (US2008054123) describes an operation mechanism that is adapted for activating a deceleration device for decelerating an opening movement of a door. The operation mechanism features a first mode of operation and a second operation mode. In the first mode of operation the operation mechanism allows free rotation of the door, when the operation mechanism is loaded by an impulse of the door below a predetermined threshold value.

In the second mode of operation when the operation mechanism is loaded by an impulse of the door above the predetermined threshold value the operation mechanism decelerates free rotation of the door by connecting the door to the deceleration device which will then decelerate the acceleration of the door.

Document US 2004/094670 A1 describes a method and apparatus for maintaining a panel in a closed position and releasing a panel upon application of changes resulting from a pressure change in an area adjoining the panel. The apparatus includes a latch mechanism attached to a structure that comprises a bolt for engaging a corresponding panel. The latch mechanism may be retained on the corresponding panel with the bolt engaging the structure. A pressure responsive device is provided to detect a change in pressure on one side of the panel and facilitating release of the bolt in response to a pressure change of a predetermined range or force. The latch mechanism and pressure responsive device vent to or communicate with only one side of the panel. A reservoir on one side of the panel communicates with a pressure responsive chamber of the pressure responsive device. The reservoir is generally on the same side of the panel to provide a pressure volume which is generally isolated from ambient pressure, such as during a decompression event. The method includes a method of maintaining a latch mechanism in a closed position subject to a pressure change, including sensing the pressure change on only one side of the panel.

Document RU 2 467 920 C1 describes a locking mechanism that comprises a spring-loaded holder and a retainer fitted on an axle casing. The retainer is composed of a two-arm lever while the holder represents a lug with flanges. Said flanges are composed of cylindrical rolls arranged on edges of the aforesaid lug on the retainer side to get in contact by outer surfaces with retainer arm that are furnished with an inner shoulder to hold the holder in an open position by interaction with ledges arranged on the casing and to hold that holder in a closed position in interaction with the retainer arms. The pressure surface of the lug is provided with an elastic lining. The holder and the retainer are furnished with individual springs, whereas the holder spring force is lower than that of the retainer.

Document U.S. Pat. No. 4,230,352 A describes a pivotably mounted door stop linkage having a resilient member acting on the linkage. The door stop linkage is adapted to maintain the door stop in position for conventional door operation while allowing rotation of the stop to release the door in reaction to a pressure differential acting across the door. The document US2009057490 is cited.

However, most of the current solutions that open a door when a difference in pressure is detected are based on door opening systems that have a mechanism for activating the deceleration device, eventually combined with a coupling mechanism that connects the door to the deceleration device. These solutions involve additional potential failure sources. For example, the activation mechanism and/or the coupling mechanism may fail in case of an emergency Moreover, deceleration systems with an activation and/or coupling mechanism are often complicated and heavy.

BRIEF SUMMARY OF THE INVENTION

Based on the limitations and drawbacks of the prior art, an objective is to provide a door opening system for controlling an opening of a door that separates compartments of an aircraft, and comprises a door panel, a door frame, and a deceleration mechanism. The door opening system should enable a controlled opening of the door when the air pressure difference between the area that are separated by the door exceeds a predetermined threshold. The door opening system should have a simple and light-weight design, have less failure sources than current door opening systems, and be easy to install. The deceleration mechanism should be fast, reliable, and operate without a coupling mechanism.

This objective is solved by an apparatus comprising the features of claim 1.

More specifically, a door opening system adapted to control an opening of a door module that separates compartments of an aircraft and comprises a door panel and a door frame, comprises a deceleration mechanism. The deceleration mechanism comprises a strap that connects the door panel with the door frame, a first spool, and a second spool. The first spool receives a first end of the strap, is biased to roll up a first portion of the strap, and adapted to perform a first unwinding of the first portion of the strap from the first spool with a first resistive force. The second spool receives a second end of the strap, is biased to roll up a second portion of the strap, and adapted to perform a second unwinding of the second portion of the strap from the second spool with a second resistive force that is greater than the first resistive force. The second spool comprises a braking apparatus that is adapted to decelerate the second unwinding when a velocity of the second unwinding is above a predetermined threshold.

According to some embodiments, the deceleration mechanism may use a retention belt as the strap that is wound on two spool reels.

According to some embodiments, the first spool may have a function that allows to unwind and to rewind the strap.

According to some embodiments, the first spool may be mounted on a door blade of the door module.

According to some embodiments, the second spool may have an additional function that allows to brake or decelerate the door panel in case of a rapid decompression of one of the compartments. The additional deceleration function of the second spool may be engaged at the predetermined threshold velocity of the second unwinding of the strap and at a predetermined position of the door panel during the door opening.

According to some embodiments, the deceleration function of the second spool may eliminate the need of additional activation mechanisms which would otherwise result in more complex and heavier door opening systems.

According to some embodiments, the door opening system may require a low maintenance effort and provide for a simple installation.

According to some embodiments, the door opening system may be adapted to retrofit existing door modules.

According to one aspect, the door module comprises a door damper that biases the door panel into a closed position, and a door locking system that is at least partially arranged on the door panel and maintains the door panel in the closed position.

According to one aspect, the door damper comprises a first pivot arm that is coupled to the door panel, and a second pivot arm that is coupled between the first pivot arm and the door frame.

According to one aspect, the door locking system is adapted to release the door panel from the closed position when a predetermined air pressure difference threshold between the compartments of the aircraft is exceeded.

According to one aspect, the predetermined threshold is selected based on a predetermined air pressure difference threshold between the compartments of the aircraft.

According to one aspect, the first spool performs the first unwinding of the first portion of the strap during a first move of the door panel from a closed position to a first predetermined position of the door panel, and wherein the second spool performs the second unwinding of the second portion of the strap during a second move of the door panel from the first predetermined position to a second predetermined position of the door panel.

According to one aspect, the first spool absorbs a first kinetic energy during the first move of the door panel.

According to one aspect, the second spool absorbs a second kinetic energy that is greater than the first kinetic energy during the second move of the door panel.

According to one aspect, the deceleration mechanism further comprises a mechanical end stop that stops the door panel at a third predetermined position of the door panel.

According to one aspect, the mechanical end stop absorbs a third kinetic energy during a third move of the door panel from the second predetermined position to the third predetermined position of the door panel.

According to one aspect, the mechanical end stop is attached to the door frame.

According to one aspect, the first spool is fixedly attached to the door panel, and the second spool is fixedly attached to the door frame.

According to one aspect, the first and second spools are fixedly attached to the door frame, and the deceleration mechanism further comprises a pulley that is fixedly attached to the door panel and adapted to guide the strap between the first and second spools.

According to one aspect, the strap is selected from the group consisting of a belt, a rope, a cable, a string, and a chain.

Furthermore, a method for controlling an opening of a door module that separates compartments of an aircraft and comprises a door panel and a door frame, when a predetermined air pressure difference threshold between the compartments of the aircraft is exceeded using the door opening system, comprises determining whether a difference between a first air pressure of a first compartment and a second air pressure of a second compartment exceeds the predetermined air pressure difference threshold. In response to determining that the difference between a first air pressure of a first compartment and a second air pressure of a second compartment exceeds the predetermined air pressure difference threshold, disabling a door locking system that keeps the door panel in a closed position, unwinding a first portion of a strap from a first spool that guides a first move of the door panel from the closed position to a first predetermined position, activating a braking apparatus in a second spool, unwinding a second portion of the strap with the second spool that guides a second move of the door panel from the first predetermined position to a second predetermined position, and stopping the door panel using at least one mechanical end stop that guides a third move of the door panel from the second predetermined position to a third predetermined position.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Exemplary embodiments may be included in any vehicles with a door that separates two pressurized compartments, and in which a rapid change in pressure in only one of the compartments would compromise the structural integrity of the vehicle. Examples of such vehicles may include aircrafts such as airplanes, multicopters, helicopters, drones, etc.

Figure 1:
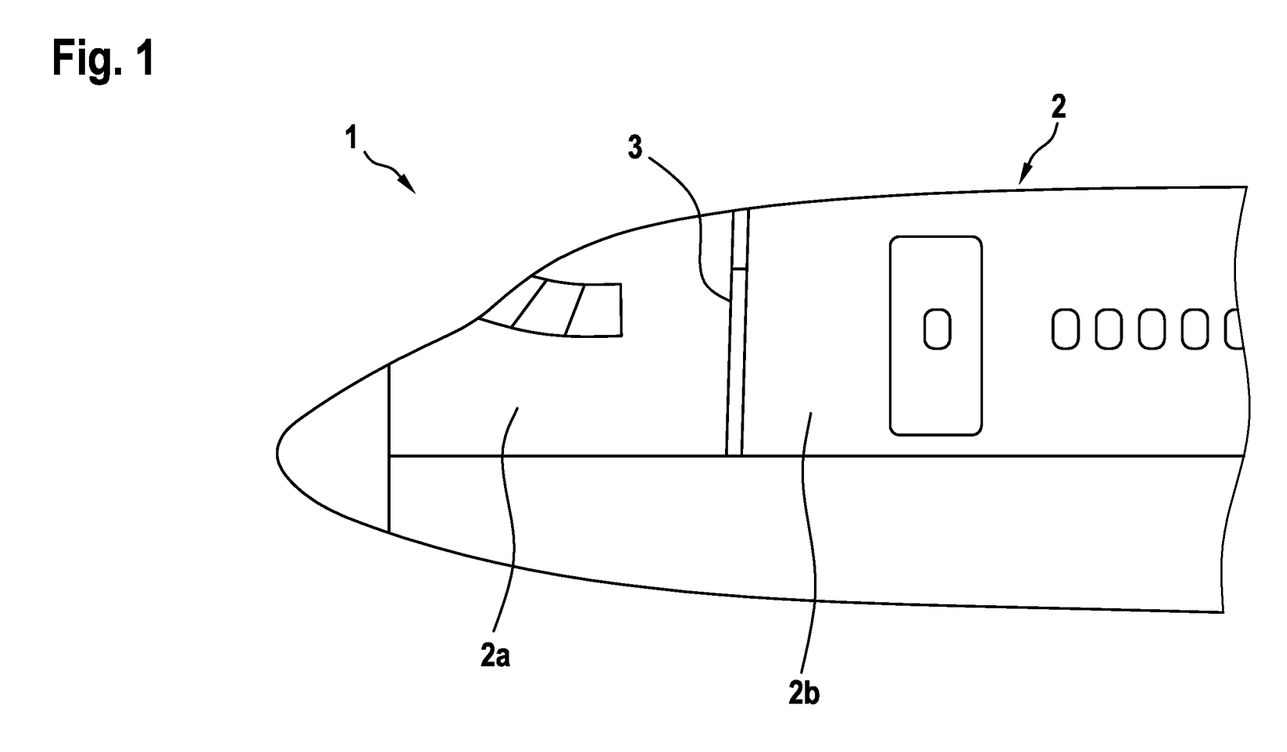
FIG. 1 is a diagram of an illustrative aircraft with a door module in accordance with some embodiments.

FIG. 1 shows an example of a vehicle 1. As shown in FIG. 1, vehicle 1 may be an aircraft, and, more particularly, an airplane. Aircraft 1 is exemplarily embodied with fuselage 2 that includes compartments 2a and 2b. A structural separation may separate compartments 2a and 2b of aircraft 1 from each other. The structural separation may include a door module 3.

In some embodiments, compartments 2a, 2b may include the cockpit, the cabin, the cargo compartment, etc. As an example, door module 3 may provide access between the cockpit and the cabin of aircraft 1. As another example, door module 3 may provide access between the cockpit and the cargo compartment, or between the cabin and the cargo compartment.

If desired, door module 3 may provide a function for dissipating a pressure difference between compartments 2a and 2b of aircraft 1. For example, door module 3 may dissipate the pressure difference between compartments 2a and 2b in case of a rapid decompression of one of compartments 2a or 2b. Rapid decompression may occur as the result of structural damage to one of compartments 2a or 2b. Releasing door module 3 from a closed position and enabling a rapid opening of door module 3 in case of a rapid loss of pressure in one of compartments 2a or 2b may prevent further damage to aircraft 1 by ensuring the establishment of equal pressure in both compartments 2a and 2b.

Figure 2:
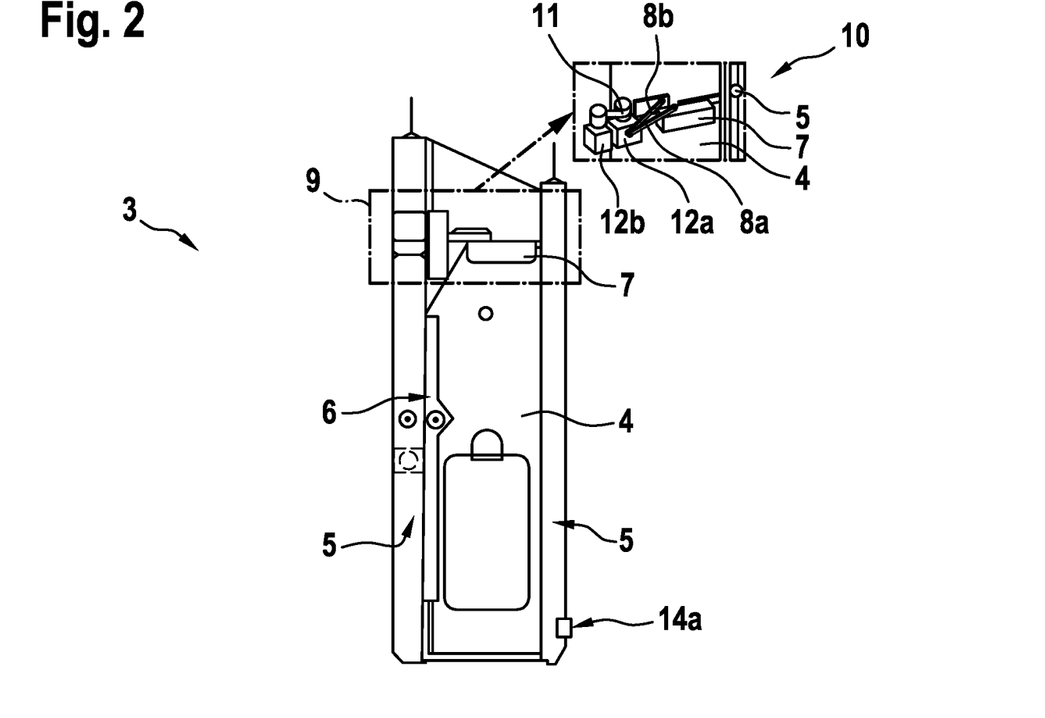
FIG. 2 is a diagram of an illustrative door module with a door opening system in accordance with some embodiments.

FIG. 2 shows illustrative door module 3 that may include a door panel 4, which is sometimes also referred to as a door blade, and a door frame 5. The door opening system 9 may include a door damper 7, a door locking system 6, pivot arms 8a, 8b and a deceleration mechanism 10.

Door damper 7 may bias door panel 4 into a closed position. Door locking system 6 may be arranged on door panel 4. Pivot arm 8a may be coupled to door damper 7, and pivot arm 8b may be coupled between pivot arm 8a and door frame 5.

As shown in FIG. 2, deceleration mechanism 10 may include strap 11 that connects door panel 4 with door frame 5. Strap 11 may be a belt, a rope, a cable, a string, a chain, or a combination thereof.

Spool 12a may receive one end of strap 11, and spool 12b may receive the other end of strap 11. Spool 12a may be biased to roll up a portion of strap 11, and spool 12b may be biased to roll up another portion of strap 11. Spools 12a, 12b may allow strap 11 to travel on a track. In some embodiments, the track may be attached to door panel 4.

If desired, door opening system 9 may be adapted to control an opening of door module 3 that separates compartments of an aircraft (e.g., compartments 2a, 2b of FIG. 1) under predetermined conditions. For example, door opening system 9 may control the opening of door module 3 if a predetermined air pressure difference threshold between the compartments is exceeded. Such a predetermined air pressure difference may be based on structural specifications of the aircraft and/or on regulations.

Figure 3:
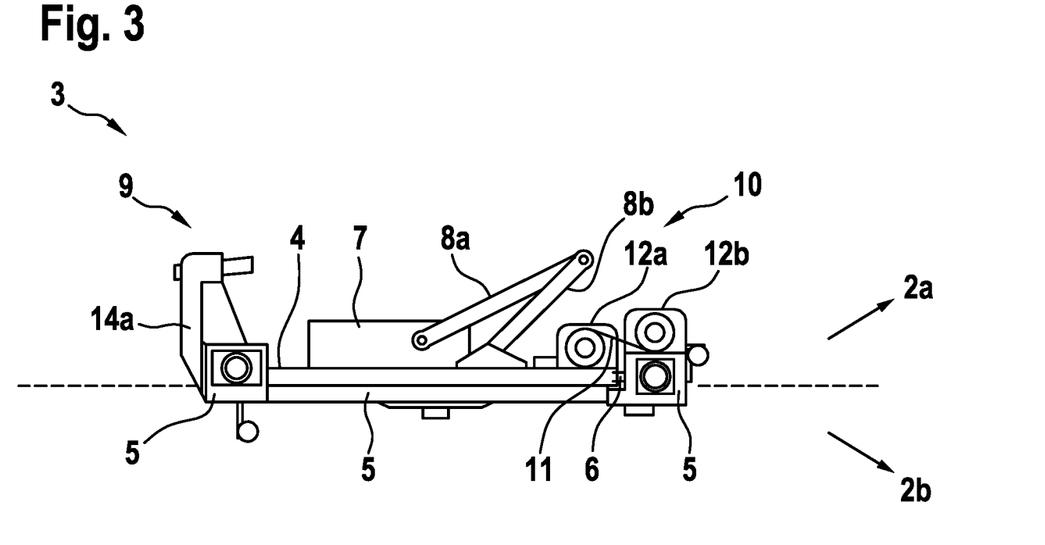
FIG. 3 is a diagram of an illustrative door opening system that includes a door panel in a closed position and a deceleration mechanism in accordance with some embodiments.
Figure 4A:
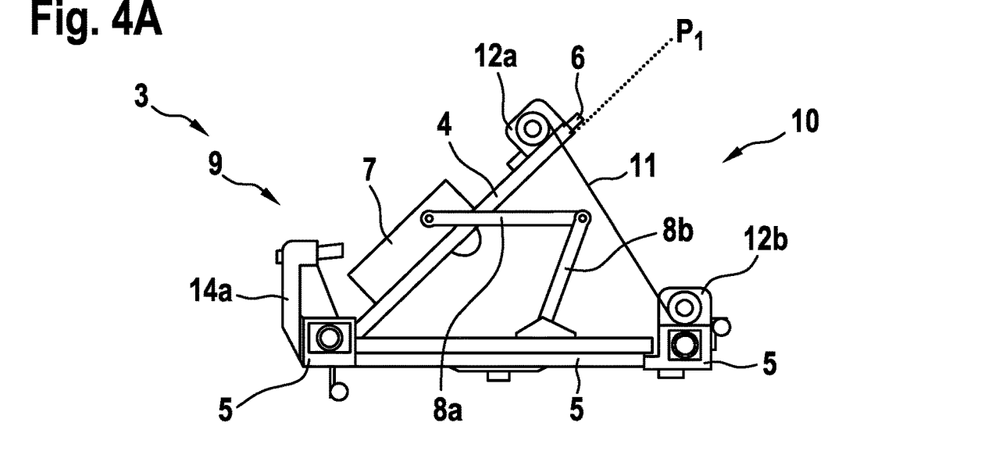
FIG. 4A is a diagram of an illustrative door opening system that includes a door panel in a first predetermined position and a deceleration mechanism in accordance with some embodiments.
Figure 4B:
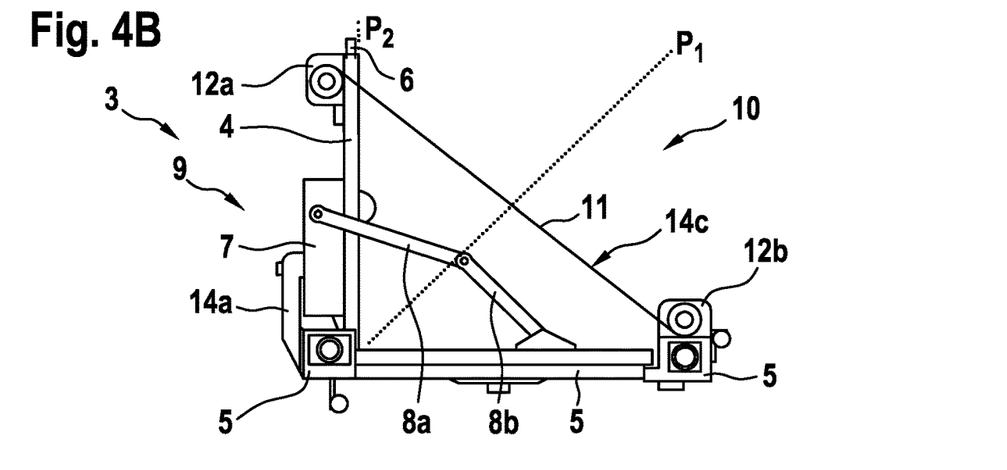
FIG. 4B is a diagram of an illustrative door opening system that includes a door panel in a second predetermined position and a deceleration mechanism in accordance with some embodiments.

If desired, door opening system 9 may control the opening of door module 3 from a first state to a second state. For example, door opening system 9 may control the opening of door module 3 during a move of door panel 4 from a first state in which door panel 4 is in a first predetermined position (e.g., a closed position as shown in FIG. 3, a first opened position P1 as shown in FIG. 4A, or a second opened position as shown in FIG. 4B), to a second state in which door panel 4 is in a second predetermined position (e.g., first opened position P1 of FIG. 4a, second opened position P2 of FIG. 4B, or third opened position P3 of FIG. 4C).

Door locking system 6 may maintain door panel 4 in a closed position. In other words, door locking system 6 may maintain door panel 4 in a position in which door panel 4 closes door frame 5, thereby denying access through door frame 5.

In some embodiments, door locking system 6 may release door panel 4 from the closed position under predetermined conditions. For example, door locking system 6 may release door panel 4 from the closed position, if a predetermined air pressure difference threshold between compartments 2a, 2b is exceeded. Thus, door opening module 4 may ensure decompression of the compartment with the higher air pressure, thereby harmonizing the air pressure in compartment 2a with the air pressure in compartment 2b.

In some embodiments, door opening module 3 may ensure harmonization of the air pressure between compartments 2a and 2b within a predetermined time interval.

As an example, consider the scenario in which door module 3 separates a cockpit of an aircraft from a cabin of the aircraft. In other words, compartments 2a and 2b are embodied by cockpit and cabin, respectively. In this scenario, door panel 4 may be placed perpendicular to a floor surface of the aircraft. Door panel 4 may be mounted on door frame 5 by hinges that are aligned along an axis perpendicular to the surface of the floor. In some embodiments, the hinges may be located on the cockpit side of door panel 4 so that the hinges are inaccessible from the cabin. Door module 3 may have no gaps between door panel 4 and door frame 5, if desired.

In some embodiments, door panel 4 and door frame 5 may allow the opening of door panel 4 toward the cockpit. It is understood that door panel 4 may be mounted on door frame 5 in a different way. As an example, the hinges may be located on the cabin side of door panel 4 and/or door panel 4 may open toward the cabin.

To satisfy current safety regulations for passenger aircraft, door module 3 may be locked (i.e., door locking system 6 may maintain door panel 4 in a position in which door panel 4 closes door frame 5) as soon as the aircraft leaves the parking area and for the entire duration of the flight. Door locking system 6 may include a set of electric strikers or bolts that is installed in the side of door panel 4 (i.e., at the edge of the door or near the edge of the door).

In a locked position, these strikers or bolts are inserted in tumblers mounted in door frame 5 or in openings of door frame 5 that are adapted to receive the strikers or bolts. If desired, the strikers or bolts may be controlled electrically. More specifically, the strikers or bolts may be powered continuously to ensure that door locking system 6 maintains door panel 4 in a locked position. When the electric power supply is cut off, the strikers or bolts may slide toward an unlocked position, if desired.

FIG. 3 illustrates door module 3 with door panel 4 in a closed position. Door module 3 may separate compartments 2a, 2b of a fuselage of an aircraft (e.g., fuselage 2 of aircraft 1 of FIG. 1). As shown, door module 3 may include door panel 4, door frame 5, door opening system 9, door damper 7, and door locking system 6.

Door locking system 6 may at least partially be arranged on door panel 4. If desired, door locking system 6 may maintain door panel 4 in the closed position.

Door damper 7 may bias door panel 4 into the closed position. In some embodiments, door damper 7 may include pivot arms 8a, 8b. Pivot arm 8a may be coupled to door panel 4 via door damper 7, and pivot arm 8b may be coupled between pivot arm 8a and door frame 5. As shown, door damper 7 is mounted on door panel 4. However, door damper 7 may be mounted on any other surface that enables door damper 7 to bias door panel 4 into the closed position. For example, door damper 7 may be mounted on door frame 5, on a surface above door frame 5, on a surface that is perpendicular to door frame 5, etc.

Door opening system 9 may include deceleration mechanism 10. Deceleration mechanism 10 may include strap 11 that connects door panel 4 with door frame 5, spool 12a that receives an end of strap 11, and spool 12b that receives another end of strap 11. If desired, deceleration mechanism 10 may include mechanical end stop 14a. In some embodiments, mechanical end stop 14a may be attached to door frame 5.

If desired, door module 3 may include a door closer instead of door damper 7. The door closer may include a spring that may store the energy used in the opening of door panel 4 in a compression or torsion spring. The spring may release the stored energy to close door panel 4.

If desired, the door closer may allow for adjustment of the strength of the spring, making it easier or more difficult to push door panel 4 open. For limiting the speed at which door panel 4 is closed, the door closer may use hydraulic (e.g., oil-filled) dampers. In some embodiments, spring mechanisms may be used for damping.

In some embodiments, door panel 4 may be placed perpendicular to a floor surface of an aircraft, such as aircraft 1 of FIG. 1. Door panel 4 may be mounted on door frame 5 by hinges. If desired, the hinges may be attached to door frame 5 along an axis perpendicular to the floor surface. in some embodiments, door damper 7 may be mounted on the top of door panel 4 at the hinge side (i.e., at the side opposite door locking system 6).

If desired, door damper 7 may be automatic. Door damper 7 may include a housing that is mounted to door panel 4. Pivot arm 8a may be attached to the housing of door damper 7. Pivot arm 8a and pivot arm 8b may be attached to each other by means of hinges to form a vertical pivot axis for door panel 4. Pivot arm 8b may be attached to door frame 5. As shown in FIG. 3, pivot arms 8a, 8b pivot relative to each other like scissors.

FIG. 4A illustrates door module 3 with door panel 4 in predetermined position P1. As shown, door module 3 may include door panel 4, door frame 5, door opening system 9, door damper 7, and door locking system 6. Door locking system 6 may be arranged on door panel 4.

As shown, door damper 7 may be mounted to door panel 4. In some embodiments, door damper 7 may include pivot arms 8a, 8b. Pivot arm 8a may be coupled to door panel 4 (e.g., via door damper 7), and pivot arm 8b may be coupled between pivot arm 8a and door frame 5. For example, pivot arm 8a and pivot arm 8b may be attached to each other by means of hinges to form a vertical pivot axis for door panel 4. Pivot arms 8a, 8b may pivot relative to each other like scissors as door panel 4 moves to position P1, their relative angle roughly following the angle of door panel 4 relative to door frame 5.

Door opening system 9 may include deceleration mechanism 10. Deceleration mechanism 10 may include strap 11 that connects door panel 4 with door frame 5, spool 12a that receives an end of strap 11, and spool 12b that receives another end of strap 11. For example, as shown in FIG. 4A, spool 12a may be arranged on door panel 4, and spool 12b may be arranged on door frame 5 near to the edge of door panel 4.

In some embodiments, door opening system 9 may include mechanical end stop 14a. As an example, mechanical end stop 14a may be attached to door frame 5.

If desired, spools 12a, 12b may include a mechanism that keeps strap 11 rolled up on spools 12a, 12b. Such a mechanism is sometimes also referred to as a roll-up mechanism.

As an example, consider the scenario in which door module 3 is opened slowly. For example, a person may open door module 3 by unlocking door locking system 6 and moving door panel 4 from the closed position to position P1. In this scenario, spool 12a may perform an unwinding of a portion of strap 11. Spool 12a may be adapted to perform the unwinding of the portion of strap 11 from spool 12a with a resistive force. The resistive force may be predetermined, for example based on the selection of a roll-up mechanism that may include a spring. Spool 12a may absorb a kinetic energy during the move of door panel 4 from the closed position to position P1.

If desired, spool 12a may roll up any slack in strap 11 when door panel 4 is in a position that is between the closed position and position P1. In other words, spool 12a may handle unrolling and rolling up of strap 11 when door panel 4 is moved between the closed position and predetermined position P1.

In some embodiments, only spool 12*a* may unroll strap 11 when door panel 4 moves between the closed position and position P1. In other embodiments, spools 12*a*, 12*b* may both unroll and/or roll up strap 11 when door panel 4 is moved between the closed position and position P1. The extend as to which one of spools 12*a*, 12*b* acts upon strap 11 may be predetermined, for example based on the selection of the roll-up mechanisms installed in spools 12*a* and 12*b*.

FIG. 4B illustrates door module 3 with door panel 4 in predetermined position P2. As shown, door module 3 may include door panel 4, door frame 5, door opening system 9, door damper 7, and door locking system 6. Door locking system 6 may be arranged on door panel 4.

As shown, door damper 7 may be mounted to door panel 4. In some embodiments, door damper 7 may include pivot arms 8*a*, 8*b*. Pivot arm 8*a* may be coupled to door panel 4 (e.g., via door damper 7), and pivot arm 8*b* may be coupled between pivot arm 8*a* and door frame 5. For example, pivot arm 8*a* and pivot arm 8*b* may be attached to each other by means of hinges to form a vertical pivot axis for door panel 4. Pivot arms 8*a*, 8*b* may pivot relative to each other like scissors as door panel 4 moves to position P2, their relative angle roughly following the angle of door panel 4 relative to door frame 5.

Door opening system 9 may include deceleration mechanism 10. Deceleration mechanism 10 may include strap 11 that connects door panel 4 with door frame 5, spool 12*a* that receives an end of strap 11, and spool 12*b* that receives another end of strap 11. If desired, strap 11 may include deformation element 14*c*. For example, as shown in FIG. 4B, spool 12*a* may be arranged on door panel 4, and spool 12*b* may be arranged on door frame 5 near to the edge of door panel 4. Deformation element 14*c* may enable a deformation of strap 11 in longitudinal direction.

In some embodiments, door opening system 9 may include mechanical end stop 14*a*. As an example, mechanical end stop 14*a* may be attached to door frame 5.

If desired, spools 12*a*, 12*b* may include a mechanism that keeps strap 11 rolled up on spools 12*a*, 12*b*. Such a mechanism is sometimes also referred to as a roll-up mechanism.

For example, if a person opens door module 3, spool 12*a* may unwind strap 11 during the move of door panel 4 from the closed position to position P1, and spool 12*b* may unwind strap 11 during the move of door panel 4 from position P1 to position P2. In some embodiments, spools 12*a* and 12*b* may both unwind strap 11 between the closed position and position P1 and between position P1 and position P2 of door panel 4. The extend as to which one of spools 12*a*, 12*b* acts upon strap 11 may be predetermined, for example based on the selection of the roll-up mechanisms installed in spools 12*a* and 12*b*.

Spool 12*a* and/or spool 12*b* may be adapted to perform the unwinding of a respective portion of strap 11 from spool 12*a* and/or spool 12*b* with a respective resistive force. The respective resistive force may be predetermined, for example based on the selection of a respective roll-up mechanism in the respective spool 12*a*, 12*b*. The resistive force of spool 12*a* may be greater than, equal to, or smaller than the resistive force spool 12*b*. If desired, the respective roll-up mechanism may include a respective spring.

During the opening of door module 3, door panel 4 may have a kinetic energy associated with the motion of door panel 4. Spool 12*a* may absorb a portion of the kinetic energy during the move of door panel 4 from the closed position to position P1. Spool 12*b* may absorb another portion of the kinetic energy during the move of door panel 4 from position P1 to position P2. The kinetic energy absorbed by spool 12*a* may be greater than, equal to, or smaller than the kinetic energy absorbed by spool 12*b*. In some embodiments, deformation element 14*c* may absorb yet another portion of the kinetic energy through a deformation of strap 11 in longitudinal direction.

If desired, spool 12*b* may roll up any slack in strap 11 when door panel 4 is in a position that is between position P1 and position P2. In other words, spool 12*b* may handle unrolling and rolling up of strap 11 when door panel 4 moves between predetermined positions P1 and P2.

Figure 4C:
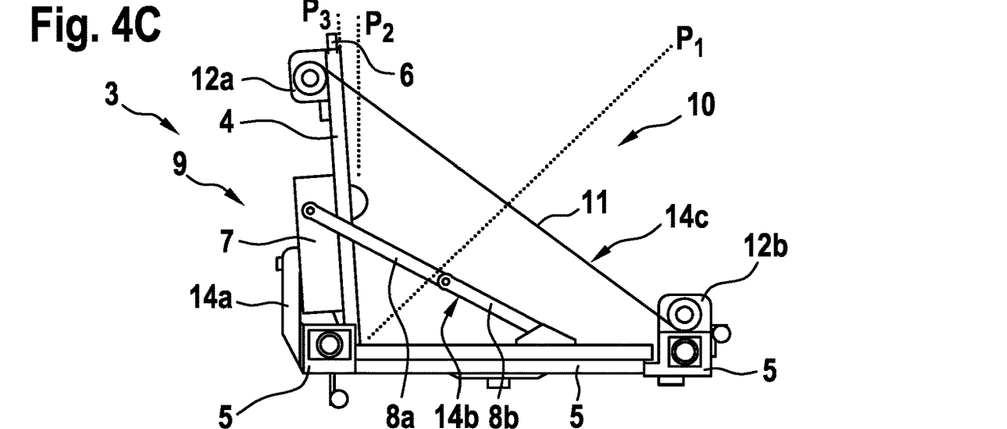
FIG. 4C is a diagram of an illustrative door opening system that includes a door panel in a third predetermined position and a deceleration mechanism in accordance with some embodiments.

FIG. 4C illustrates door module 3 with door panel 4 in position P3. As shown, door module 3 may include door panel 4, door frame 5, door opening system 9, door damper 7, and door locking system 6. Door locking system 6 may be arranged on door panel 4.

As shown, door damper 7 may be mounted on door panel 4. In some embodiments, door damper 7 may include pivot arms 8*a*, 8*b*. Pivot arm 8*a* may be coupled to door panel 4, and pivot arm 8*b* may be coupled between pivot arm 8*a* and door frame 5.

In some embodiments, pivot arm 8*a* may be attached to door damper 7. Pivot arm 8*a* and pivot arm 8*b* may be attached to each other by means of hinges to form a vertical pivot axis for door panel 4. Pivot arm 8*b* may be attached to frame 5. Pivot arms 8*a*, 8*b* may pivot relative to each other like scissors as door panel 4 moves between the closed position and position P3. In some embodiments, the relative angle between pivot arms 8*a* and 8*b* may be 180° at position P3 of door panel 4.

In some embodiments, pivot arms 8*a*, 8*b* may include deformation or friction elements 14*b*. If desired, door damper 7 may include devices that control the closing force and speed of door panel 4. As an example, door damper 7 may include one or more deformation or friction elements such as a spring, a piston, a hydraulic channel and/or a valve that regulates the closing movement.

Door opening system 9 may include deceleration mechanism 10. Deceleration mechanism 10 may include strap 11 that connects door panel 4 with door frame 5, spool 12*a* that receives an end of strap 11, and spool 12*b* that receives another end of strap 11. If desired, strap 11 may include deformation element 14*c*. Deformation element 14*c* may enable a deformation of strap 11 in longitudinal direction.

In some embodiments, door opening system 9 may include mechanical end stop 14*a*. As an example, mechanical end stop 14*a* may be attached to door frame 5. If desired, mechanical end stop 14*a* may be attached to any other surface that enables mechanical end stop 14*a* to limit the opening of door panel 4.

If desired, spools 12*a*, 12*b* may include a mechanism that keeps strap 11 rolled up on spools 12*a*, 12*b*. Such a mechanism is sometimes also referred to as a roll-up mechanism. As shown in FIG. 4C, spool 12*a* may be attached to door panel 4, and spool 12*b* may be attached to door frame 5 near to the edge of door panel 4.

If desired, strap 11 may be selected from the group including a belt, a rope, a cable, a string, and a chain. Strap 11 may include deformation element 14*c*. Deformation element 14*c* may be stretched under the tensile load from a rapid decompression. As an example, deformation element 14*c* may be made from materials that include one or more materials of high resilience such as elastomers, steel, composite materials, etc. As another example, deformation element 14*c* may include materials of a high plasticity such as soft thermoplastics and/or metals such as steel, tempered iron, copper, etc. In some embodiments, deformation element 14c may be made from materials of both, high elasticity and high plasticity.

As an example, consider the scenario in which the air pressure difference between compartments 2a, 2b of FIGS. 1 and 3 needs to be equalized rapidly (e.g., when a predetermined air pressure difference threshold between compartments 2a and 2b is exceeded). For example, a sensor system may measure the relative pressure difference between compartments 2a and 2b. If desired, door opening system 9 may include such a sensor system. In some embodiments, the sensor system may generate a trigger signal when the predetermined air pressure difference threshold between compartments 2a, 2b is exceeded. If desired, door opening system 9 may generate a trigger signal based on signals received from the sensor system.

In this scenario, door opening system 9 may rapidly move door panel 4 from a closed position to an open position. If desired, door opening system 9 may rapidly move door panel 4 from the closed position to the open position based on a trigger signal.

During the move of door panel 4 from the closed position to the open position, door panel 4 may have a comparatively high kinetic energy, which may be based on the air pressure difference between the compartments. During the move of door panel 4 from the closed position to position P2 (see FIGS. 4A and 4B), deceleration mechanism 10 of door opening system 9 may unwind strap 11 from spools 12a and 12b.

Spool 12a may be adapted to perform unwinding of strap 11 from spool 12a with a first resistive force. As an example, the first resistive force may be based on a friction between strap 11 and spool 12a and/or on a roll-up mechanism in spool 12a. Spool 12a may absorb a portion of the kinetic energy of door panel 4 during a move of door panel 4 from the closed position to position P1.

According to some embodiments, the friction between spool 12a and strap 11 may be neglected. In other words, spool 12a may unwind strap 11 rapidly with almost no deceleration when door panel 4 moves from the closed position to position P1.

Spool 12b may be adapted to perform unwinding of strap 11 from spool 12b with a second resistive force. The second resistive force exerted by spool 12b may be greater than the first resistive force exerted by spool 12a. Spool 12b may absorb most of the kinetic energy of door panel 4 during a move of door panel 4 from position P1 to position P2. In other words, the kinetic energy absorbed by spool 12b is greater than the kinetic energy absorbed by spool 12a. In position P2, spools 12a and 12b may have completely unrolled strap 11.

If desired, spool 12b may include a braking apparatus that is adapted to decelerate the unwinding of strap 11 from spool 12b when the velocity of unwinding is above a predetermined threshold.

For example, spool 12b may include speed activated engagement means that engage the braking apparatus when door panel 4 moves from position P1 to position P2 with a velocity that is above a predetermined threshold. As an example, the braking apparatus may include a retractor that causes a spring inside the apparatus to apply the braking apparatus to spool 12b when strap 11 is being pulled rapidly. In some embodiments, spool 12b may engage braking apparatus based on a trigger signal. The trigger signal may be an electric trigger signal generated by a sensor system.

The braking mechanism may include structural parts that reduce the unwinding velocity (i.e., negatively accelerate the unwinding) of strap 11 from spool 12b. As an example, the structural parts may include parts that deform plastically. Such parts may include any parts that elongate, compress, buckle, bend, or twist such as a spring, a strut, a coil, a shock absorber, or a combination thereof, just to name a few. As another example, the structural parts may include parts that transform the kinetic energy of the door panel 4 into heat (e.g., through friction) such as brakes. If desired, the braking mechanism may include a combination of structural parts that deform plastically and structural parts that transform kinetic energy into heat.

In position P2, spools 12a, 12b may have completely unrolled strap 11. In some scenarios, the kinetic energy of door panel 4 may be non-zero at position P2. Mechanical end stop 14a may allow door panel 4 to stop at position P3, thereby absorbing at least a portion of the kinetic energy that door panel 4 may have at position P2. Strap 11 may stretch from position P2 to position P3 of door panel 4, thereby absorbing another portion of the kinetic energy that door panel 4 may have at position P2.

Figure 5A:
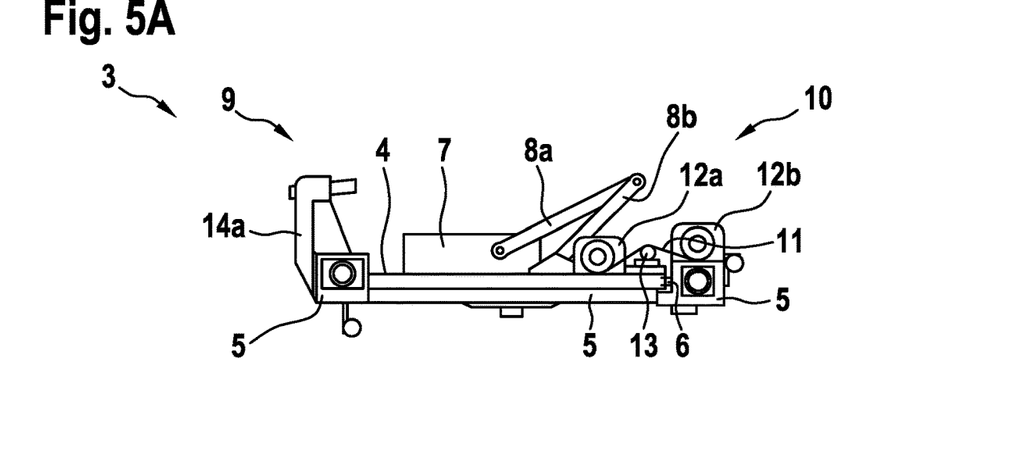
FIG. 5A is a diagram of an illustrative door opening system that includes the door panel in a closed position and a deceleration mechanism having a pulley in accordance with some embodiments.

FIG. 5A illustrates door module 3 with door panel 4 in a closed position. As shown, door module 3 may include door panel 4, door frame 5, door opening system 9, door damper 7, and door locking system 6. Door locking system 6 may be arranged on door panel 4.

Door opening system 9 may include deceleration mechanism 10. Deceleration mechanism 10 may include strap 11 that connects door panel 4 with door frame 5, spool 12a that receives the end of strap 11, and spool 12b that receives another end of strap 11. Spools 12a, 12b may have most of strap 11 rolled up at the closed position of door panel 4. In other words, spools 12a and 12b have less of strap 11 rolled up in any position of door panel 4 that is different than the closed position. If desired, door opening system 9 may include pulley 13 that may be adapted to guide strap 11 between spools 12a and 12b. Pulley 13 may include a shaft that is designed to support movement and change of movement direction of strap 11.

As shown in FIG. 5A, spool 12a may be attached to door frame 5, spool 12b to a surface next to door frame 5 and pulley 13 to door panel 4. However, other configurations in which pulley 13 is adapted to guide strap 11 between spools 12a and 12b are considered as well. For example, spools 12a and 12b may both be attached to door frame 5 and pulley 13 to door panel 4, spools 12a and 12b may both be attached to a surface next to door frame 5 and pulley 13 to door panel 4, spool 12a may be attached to a surface next to door frame 5, spool 12b to door frame 5, and pulley 13 to door panel 4, spools 12a and 12b may both be attached to door panel 4 and pulley 13 to door frame 5 or a surface next to door frame 5, etc.

In some embodiments, door opening system 9 may include mechanical end stop 14a. As an example, mechanical end stop 14a may be attached to door frame 5.

If desired, door damper 7 may be mounted on door panel 4 and may regulate the closing movement of door panel 4. Pivot arm 8a may be attached to door damper 7. Pivot arm 8a and pivot arm 8b may be attached to each other by means of hinges to form a vertical pivot axis for door panel 4. Pivot arm 8b may be attached to frame 5.

Figure 5B:
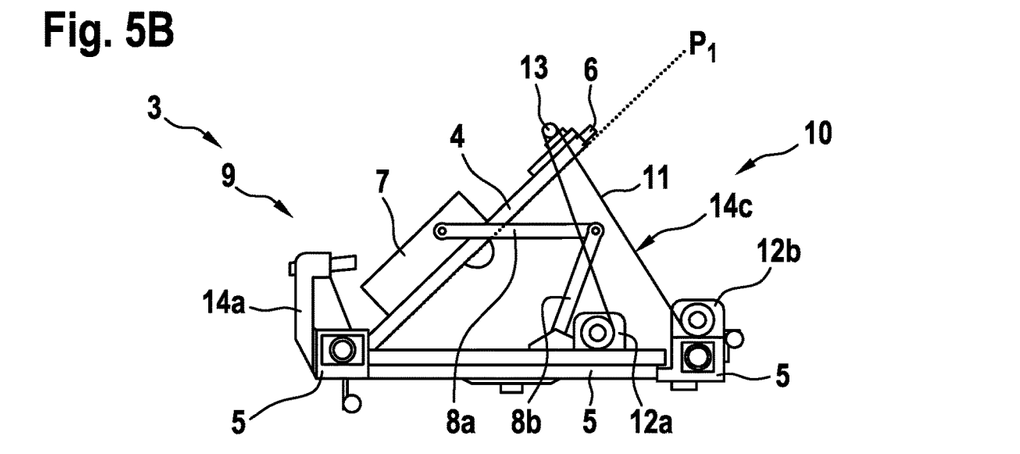
FIG. 5B is a diagram of an illustrative door opening system that includes the door panel in a first predetermined position and a deceleration mechanism having a pulley in accordance with some embodiments.

FIG. 5B illustrates door module 3 of FIG. 5A with door panel 4 in predetermined position P1. Spool 12a may unroll strap 11 during the move of door panel 4 from the closed position (see FIG. 5A) to position P1. If desired, strap 11 may be unrolled by only spool 12a between the closed position and position P1 of door panel 4. Any slack in strap 11 may be taken up by spool 12a. Strap 11 may be completely unrolled from spool 12a at position P1.

In some embodiments, strap 11 may include one or more deformation elements 14c. As an example, deformation elements 14c may be made to include high elasticity materials such as elastomers, shape memory metals, composite materials, etc. As another example, deformation elements 14c may be made to include high plasticity materials such as soft thermoplastics and/or metals such as steel, tempered iron, copper, etc. In some embodiments, deformation elements 14c may be made to include both high elasticity and high plasticity materials.

Figure 5C:
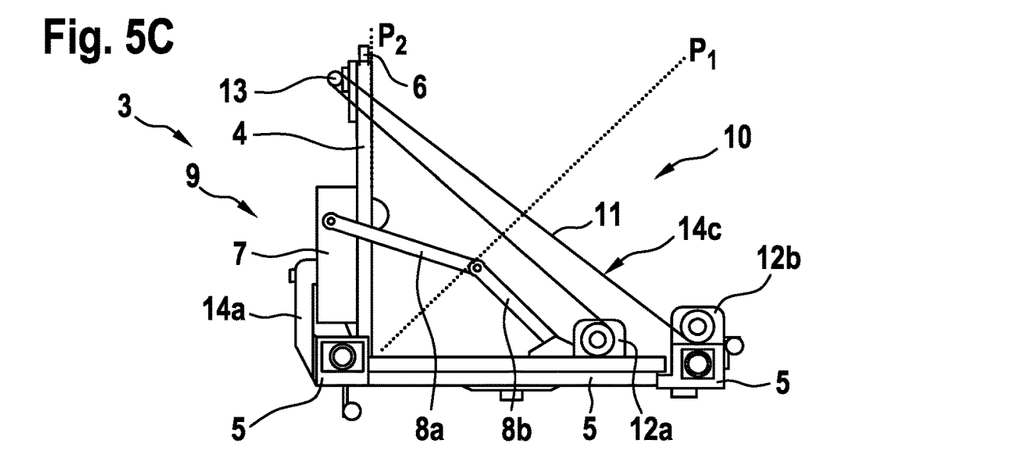
FIG. 5C is a diagram of an illustrative door opening system that includes the door panel in a second predetermined position and a deceleration mechanism having a pulley in accordance with some embodiments.

FIG. 5C illustrates door module 3 of FIG. 5A with door panel 4 in position P2. During a move of door panel 4 from the closed position to position P2, only spool 12a may unwind strap 11 while door panel 4 is between the closed position and position P1, and only spool 12b may unwind strap 11 while door panel 4 is between position P1 and position P2. Strap 11 may freely follow movements of door panel 4 between the closed position and position P2. Pulley 13 may support the movement of strap 11.

As an example, consider the scenario in which the air pressure difference between compartments 2a, 2b of FIGS. 1 and 3 needs to be equalized rapidly (e.g., when a predetermined air pressure difference threshold between compartments 2a and 2b is exceeded). For example, a sensor system may measure the relative pressure difference between compartments 2a and 2b. If desired, door opening system 9 may include such a sensor system. In some embodiments, the sensor system may generate a trigger signal when the predetermined air pressure difference threshold between compartments 2a, 2b is exceeded. The trigger signal may be electric, mechanic, or a combination thereof. If desired, door opening system 9 may generate a trigger signal based on signals received from the sensor system.

In this scenario, door opening system 9 may rapidly move door panel 4 from a closed position to an open position. If desired, door opening system 9 may rapidly move door panel 4 from the closed position to the open position based on the trigger signal.

During the move of door panel 4 from the closed position to the open position, door panel 4 may have a comparatively high kinetic energy, which may be based on the air pressure difference between the compartments. During the move of door panel 4 from the closed position to position P2 (see FIGS. 5A to 5C), deceleration mechanism 10 of door opening system 9 may unwind strap 11 from spools 12a and 12b via pulley 13.

Spool 12a may be adapted to perform unwinding of strap 11 from spool 12a with a first resistive force. As an example, the first resistive force may be based on a friction between strap 11 and spool 12a and/or on a roll-up mechanism in spool 12a. Spool 12a may absorb a portion of the kinetic energy of door panel 4 during a move of door panel 4 from the closed position to position P1.

According to some embodiments, the friction between spool 12a and strap 11 and/or the friction between strap 11 and pulley 13 may be neglected. In other words, spool 12a may unwind strap 11 rapidly with almost no deceleration when door panel 4 moves from the closed position to position P1.

Spool 12b may be adapted to perform unwinding of strap 11 from spool 12b with a second resistive force. The second resistive force exerted by spool 12b may be greater than the first resistive force exerted by spool 12a. Spool 12b may absorb most of the kinetic energy of door panel 4 during a move of door panel 4 from position P1 to position P2. In other words, the kinetic energy absorbed by spool 12b is greater than the kinetic energy absorbed by spool 12a and pulley 13. In position P2, spools 12a and 12b may have completely unrolled strap 11.

If desired, spool 12b may include a braking apparatus that is adapted to decelerate the unwinding of strap 11 from spool 12b when the velocity of unwinding is above a predetermined threshold.

For example, spool 12b may include speed activated engagement means that engage the braking apparatus when door panel 4 moves from position P1 to position P2 with a velocity that is above a predetermined threshold. As an example, the braking apparatus may include a retractor that causes a spring inside the apparatus to apply the braking apparatus to spool 12b when strap 11 is being pulled rapidly. In some embodiments, spool 12b may engage braking apparatus based on the trigger signal.

The braking mechanism may include structural parts that reduce the unwinding velocity (i.e., negatively accelerate the unwinding) of strap 11 from spool 12b. As an example, the structural parts may include parts that deform plastically. Such parts may include any parts that elongate, compress, buckle, bend, or twist such as a spring, a strut, a coil, a shock absorber, or a combination thereof, just to name a few. As another example, the structural parts may include parts that transform the kinetic energy of the door panel 4 into heat (e.g., through friction) such as brakes. If desired, the braking mechanism may include a combination of structural parts that deform plastically and structural parts that transform kinetic energy into heat.

Figure 6:
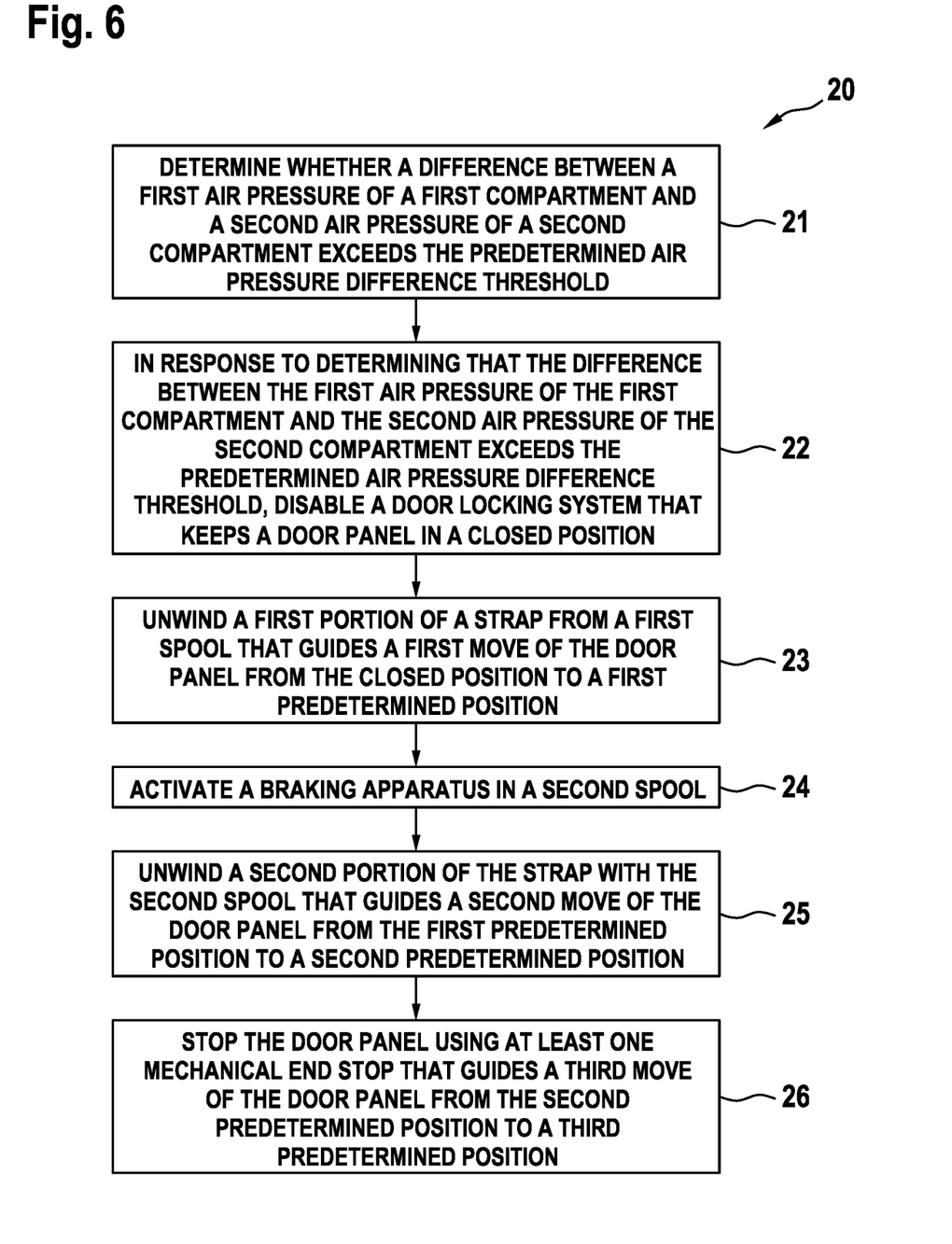
FIG. 6 is a diagram of a flowchart showing illustrative operations for controlling an opening of a door module using a door opening system in accordance with some embodiments.

FIG. 6 is a flowchart 20 showing illustrative operations for controlling the opening of a door module that separates compartments of an aircraft (e.g., door module 3 of FIG. 3 that separates compartments 2a, 2b of aircraft 1 of FIG. 1) when a predetermined air pressure difference threshold between the compartments is exceeded using a door opening system such as door opening system 9 of FIGS. 2 to 5C in accordance with some embodiments. If desired, the door module may include a door panel, a door frame, and the door opening system.

During operation 21, the door opening system may determine whether a difference between a first air pressure of a first compartment and a second air pressure of a second compartment exceeds the predetermined air pressure difference. For example, door opening system 9 of FIGS. 2 to 5C may determine that the air pressure difference between compartments 2a, 2b of FIGS. 1 and 2 exceeds a predetermined air pressure difference threshold.

In response to determining that the difference between the first air pressure of the first compartment and the second air pressure of the second compartment exceeds the predetermined air pressure difference threshold, during operation 22, the door opening system may disable a door locking system that keeps the door panel in the closed position. For example, in response to determining that the difference between the air pressure of compartment 2a and the air pressure of compartment 2b exceeds the predetermined air pressure difference threshold, door opening system 9 may disable door locking system 6 of FIGS. 2 to 5C.

During operation 23, the door opening system may unwind a first portion of a strap from a first spool that guides a first move of the door panel from the closed position to a first predetermined position. For example, a first portion of strap 11 of FIGS. 2 to 5C may be unwound from spool 12a of FIGS. 2 to 5C that guides a first move of door panel 4 from the closed position shown in FIGS. 3 and 5A to predetermined position P1 of FIGS. 4A and 5B.

During operation 24, the door opening system may activate a braking apparatus in a second spool. For example, door opening system 9 of FIGS. 2 to 5C may activate the braking apparatus of spool 12b.

During operation 25, the door opening system may unwind a second portion of the strap with the second spool that guides a second move of the door panel from the first predetermined position to a second predetermined position. For example, door opening system 9 of FIGS. 2 to 5C may unwind a second portion of strap 11 with spool 12b that guides a second move of door panel 4 from predetermined position P1 of FIGS. 4A and 5B to predetermined position P2 of FIGS. 4B and 5C.

During operation 26, door opening system 9 may stop the door panel using at least one mechanical end stop that guides a third move of the door panel from the second predetermined position to a third predetermined position. For example, door opening system 9 of FIGS. 2 to 5C may stop door panel 4 using at least one mechanical end stop 14a that guides a third move of door panel 4 from predetermined position P2 of FIGS. 4B and 5C to predetermined position P3 of FIG. 4C.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, deceleration mechanism 10 of FIGS. 2 to 4C is shown with two spools 12a, 12b. However, deceleration mechanism 10 of FIGS. 2 to 4C may have any number of spools. The number of spools may be selected based on the size of the door panel, the weight of the door panel, the air pressure difference threshold value, or any other characteristic of aircraft 1, if desired.

As another example, spool 12a of FIGS. 2 to 4C is shown to be attached to door panel 4, and spool 12b of FIGS. 2 to 4C is shown to be attached to door frame 5. However, spools 12a, 12b of FIGS. 2 to 4C may be located anywhere that allows spools 12a, 12b to unwind and to roll up strap 11. For example, spool 12a of FIGS. 1 to 4C may be attached to door frame 5, and spool 12b may be attached to a wall that is outside of door frame 5 but near door panel 4, or spools 12a, 12b may both be attached to door frame 5, etc.

Moreover, in FIGS. 5A to 5C, it is shown that deceleration mechanism 10 includes one pulley 13 and two spools 12a, 12b. However, deceleration mechanism 10 of FIGS. 5A to 5C may have any number of pulleys with any number of spools. If desired, deceleration mechanism 10 may include two pulleys that are coupled with three spools. In some embodiments, pulley 13 may be attached to door frame 5 and one of the spools may be attached to door panel 4.

REFERENCE LIST

1 aircraft
2 fuselage
2a, 2b compartments
3 door module
4 door panel
5 door frame
6 door locking system
7 door damper
8a, 8b pivot arm
9 door opening system
10 deceleration mechanism
11 strap
12a, 12b spool
13 pulley
14a mechanical end stop
14b deformation or friction element
14c deformation element
20 flowchart
21, 22, 23, 24, 25, 26 operation
P1, P2, P3 predetermined position

What is claimed is:

1. A door opening system adapted to control an opening of a door module that separates compartments of an aircraft and comprises a door panel and a door frame, comprising:
   a deceleration mechanism that comprises:
      a strap that connects the door panel with the door frame,
      a first spool that receives a first end of the strap, is biased to roll up a first portion of the strap, and adapted to perform a first unwinding of the first portion of the strap from the first spool with a first resistive force, and
      a second spool that receives a second end of the strap, is biased to roll up a second portion of the strap, and adapted to perform a second unwinding of the second portion of the strap from the second spool with a second resistive force that is greater than the first resistive force, and wherein the second spool comprises a braking apparatus that is adapted to decelerate the second unwinding when a velocity of the second unwinding is above a predetermined threshold.

2. The door opening system of claim 1, wherein the door module further comprises:
   a door damper that biases the door panel into a closed position; and
   a door locking system that is at least partially arranged on the door panel and maintains the door panel in the closed position.

3. The door opening system of claim 1, wherein the door damper further comprises:
   a first pivot arm that is coupled to the door panel; and
   a second pivot arm that is coupled between the first pivot arm and the door frame.

4. The door opening system of claim 1, wherein the door panel is biased towards a closed position and the door locking system is adapted to release the door panel from the closed position when a predetermined air pressure difference threshold between the compartments of the aircraft is exceeded.

5. The door opening system of claim 1, wherein the predetermined threshold is selected based on a predetermined air pressure difference threshold between the compartments of the aircraft.

6. The door opening system of claim 5, wherein the first spool performs the first unwinding of the first portion of the strap during a first move of the door panel from a closed position to a first predetermined position of the door panel, and wherein the second spool performs the second unwinding of the second portion of the strap during a second move of the door panel from the first predetermined position to a second predetermined position of the door panel.

7. The door opening system of claim 6, wherein the first spool absorbs a first kinetic energy during the first move of the door panel.

8. The door opening system of claim 7, wherein the second spool absorbs a second kinetic energy that is greater than the first kinetic energy during the second move of the door panel.

9. The door opening system of claim 8, wherein the deceleration mechanism further comprises:

a mechanical end stop that stops the door panel at a third predetermined position of the door panel.

10. The door opening system of claim 9, wherein the mechanical end stop absorbs a third kinetic energy during a third move of the door panel from the second predetermined position to the third predetermined position of the door panel.

11. The door opening system of claim 9, wherein the mechanical end stop is attached to the door frame.

12. The door opening system of claim 1, wherein the first spool is fixedly attached to the door panel, and wherein the second spool is fixedly attached to the door frame.

13. The door opening system of claim 1, wherein the first and second spools are fixedly attached to the door frame, and wherein the deceleration mechanism further comprises:
a pulley that is fixedly attached to the door panel and adapted to guide the strap between the first and second spools.

14. The door opening system of claim 1, wherein the strap is selected from the group including a belt, a rope, a cable, a string, and a chain.

15. A method for controlling an opening of a door module that separates compartments of an aircraft and comprises a door panel and a door frame, when a predetermined air pressure difference threshold between the compartments of the aircraft is exceeded using a door opening system, the method comprising:
determining whether a difference between a first air pressure of a first compartment and a second air pressure of a second compartment exceeds the predetermined air pressure difference threshold;
in response to determining that the difference between the first air pressure of the first compartment and the second air pressure of the second compartment exceeds the predetermined air pressure difference threshold, disabling a door locking system that keeps the door panel in a closed position;
unwinding a first portion of a strap from a first spool that guides a first move of the door panel from the closed position to a first predetermined position;
activating a braking apparatus in a second spool;
unwinding a second portion of the strap with the second spool that guides a second move of the door panel from the first predetermined position to a second predetermined position; and
stopping the door panel using at least one mechanical end stop that guides a third move of the door panel from the second predetermined position to a third predetermined position.

16. A door opening system adapted to control an opening of a door module that separates compartments of an aircraft and comprises a door panel and a door frame, comprising:
a strap connecting the door panel with the door frame,
a first spool that receives a first end of the strap, is biased to roll up a first portion of the strap, and adapted to perform a first unwinding of the first portion of the strap from the first spool with a first resistive force, and
a second spool that receives a second end of the strap, is biased to roll up a second portion of the strap, and adapted to perform a second unwinding of the second portion of the strap from the second spool with a second resistive force that is greater than the first resistive force.

17. The door opening system of claim 16, wherein the second spool comprises a brake adapted to decelerate the second unwinding when a velocity of the second unwinding is above a predetermined threshold.

18. The door opening system of claim 17, wherein the first spool is fixedly attached to the door panel, and wherein the second spool is fixedly attached to the door frame.

19. The door opening system of claim 17, wherein the first and second spools are fixedly attached to the door frame, and wherein the door opening system further comprises a pulley that is fixedly attached to the door panel and adapted to guide the strap between the first and second spools.

20. The door opening system of claim 17, wherein the door panel is biased into a closed position, and the door module further comprises a door locking system that is at least partially arranged on the door panel and maintains the door panel in the closed position, wherein the first spool performs the first unwinding of the first portion of the strap during a first move of the door panel from a closed position to a first predetermined position of the door panel, and wherein the second spool performs the second unwinding of the second portion of the strap during a second move of the door panel from the first predetermined position to a second predetermined position of the door panel, and wherein the first spool absorbs a first kinetic energy during the first move of the door panel, and wherein the second spool absorbs a second kinetic energy that is greater than the first kinetic energy during the second move of the door panel.

* * * * *